Figure 3:
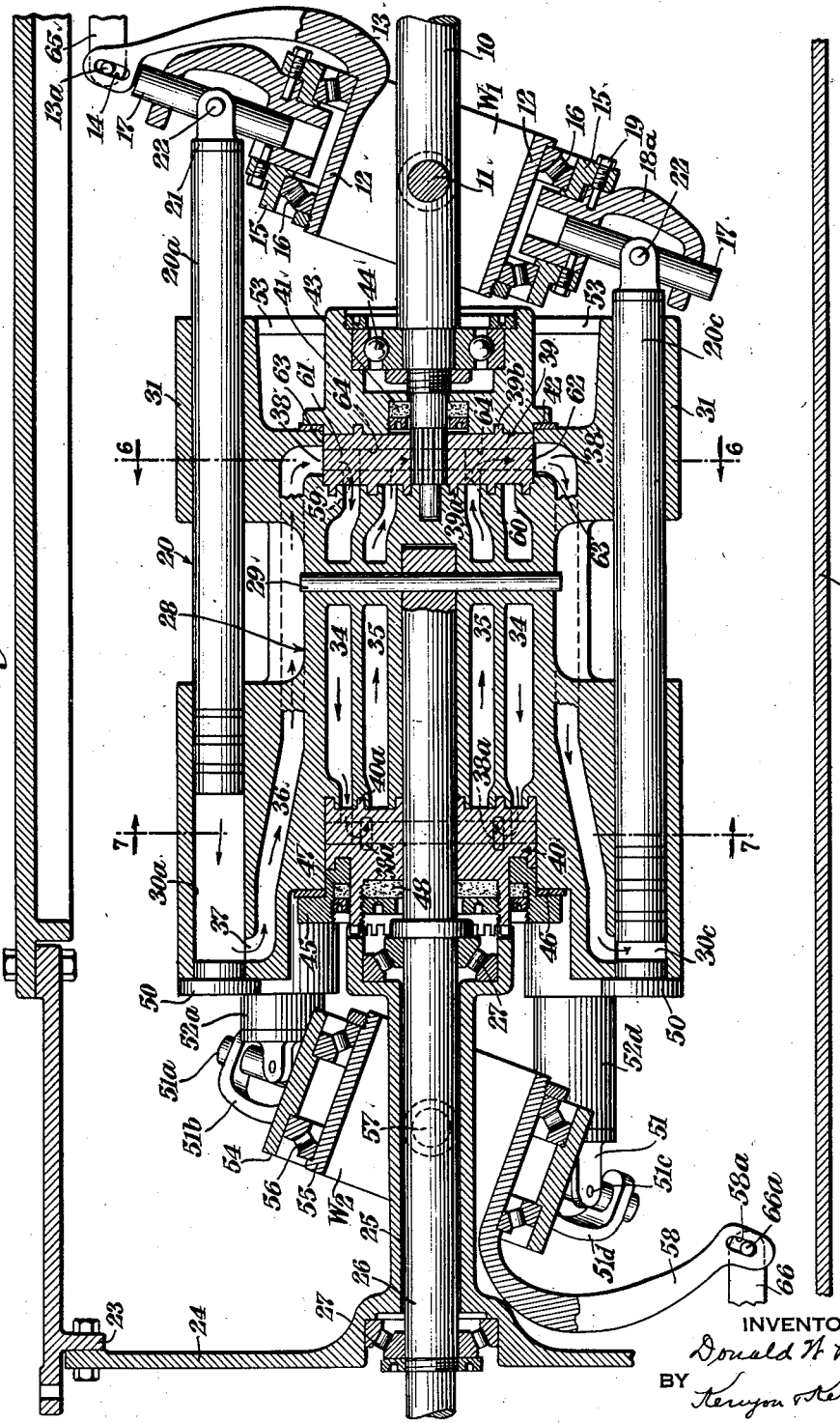

April 30, 1940. D. W. PERIN 2,199,081
VARIABLE SPEED TRANSMISSION
Filed Sept. 30, 1936 6 Sheets-Sheet 1
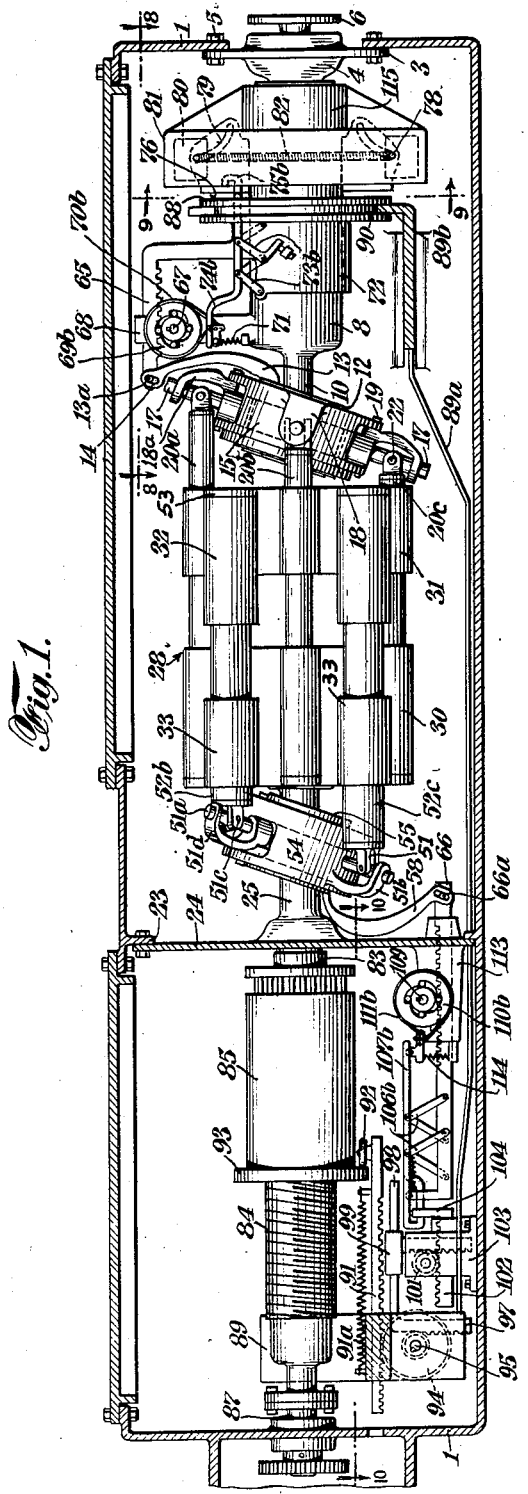
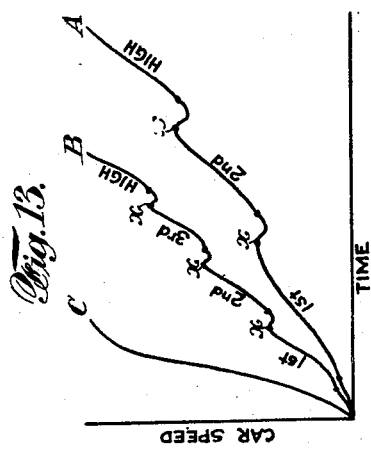
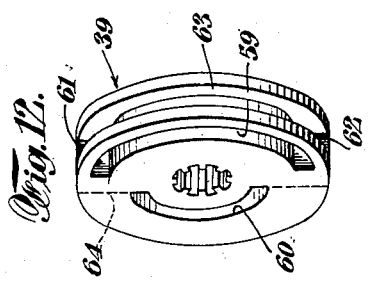
INVENTOR
Donald W. Perin
BY Kenyon & Kenyon
ATTORNEYS.

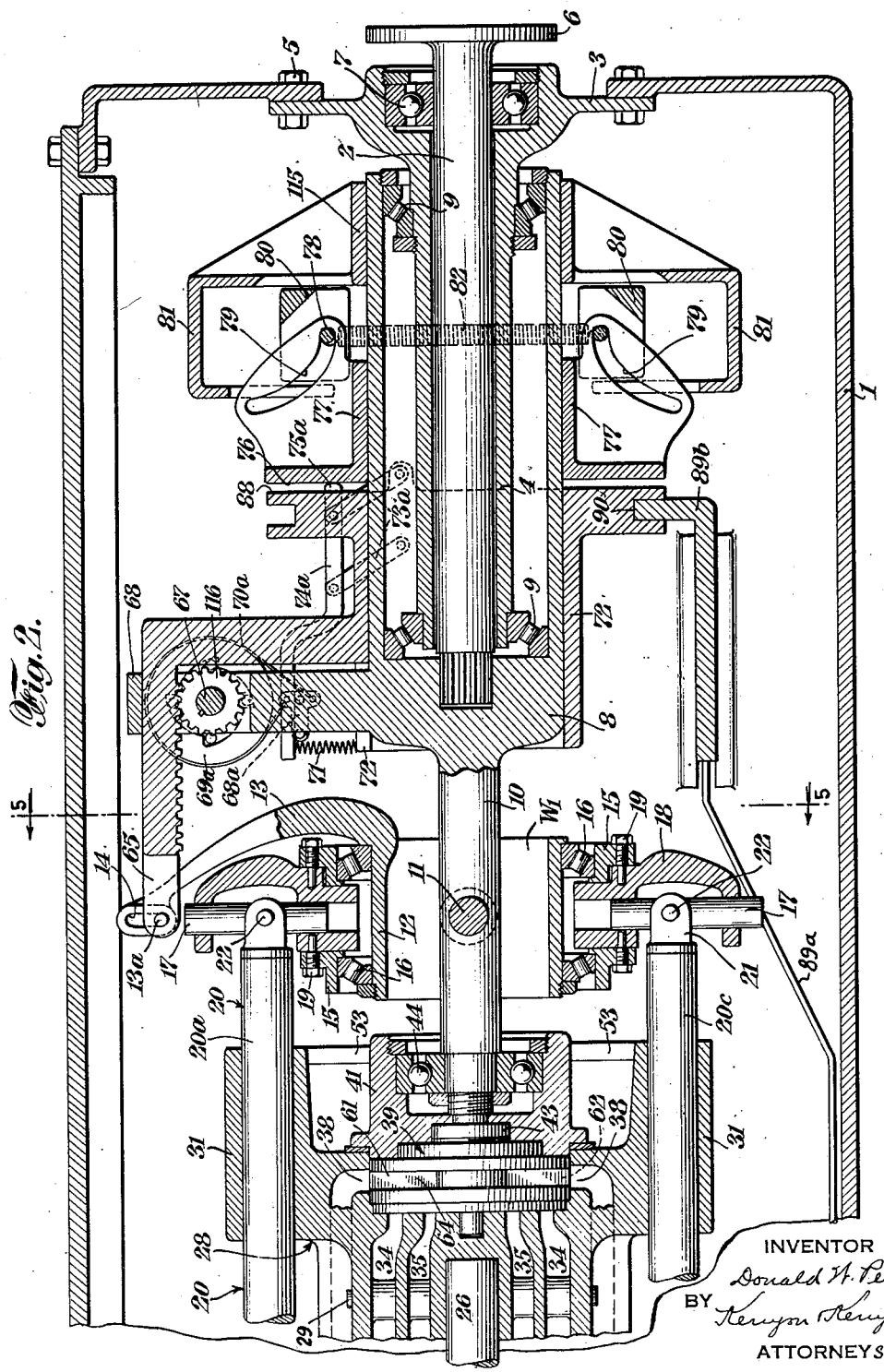

April 30, 1940.  D. W. PERIN  2,199,081
VARIABLE SPEED TRANSMISSION
Filed Sept. 30, 1936   6 Sheets-Sheet 3

INVENTOR
Donald W. Perin
BY Kenyon & Kenyon
ATTORNEYS

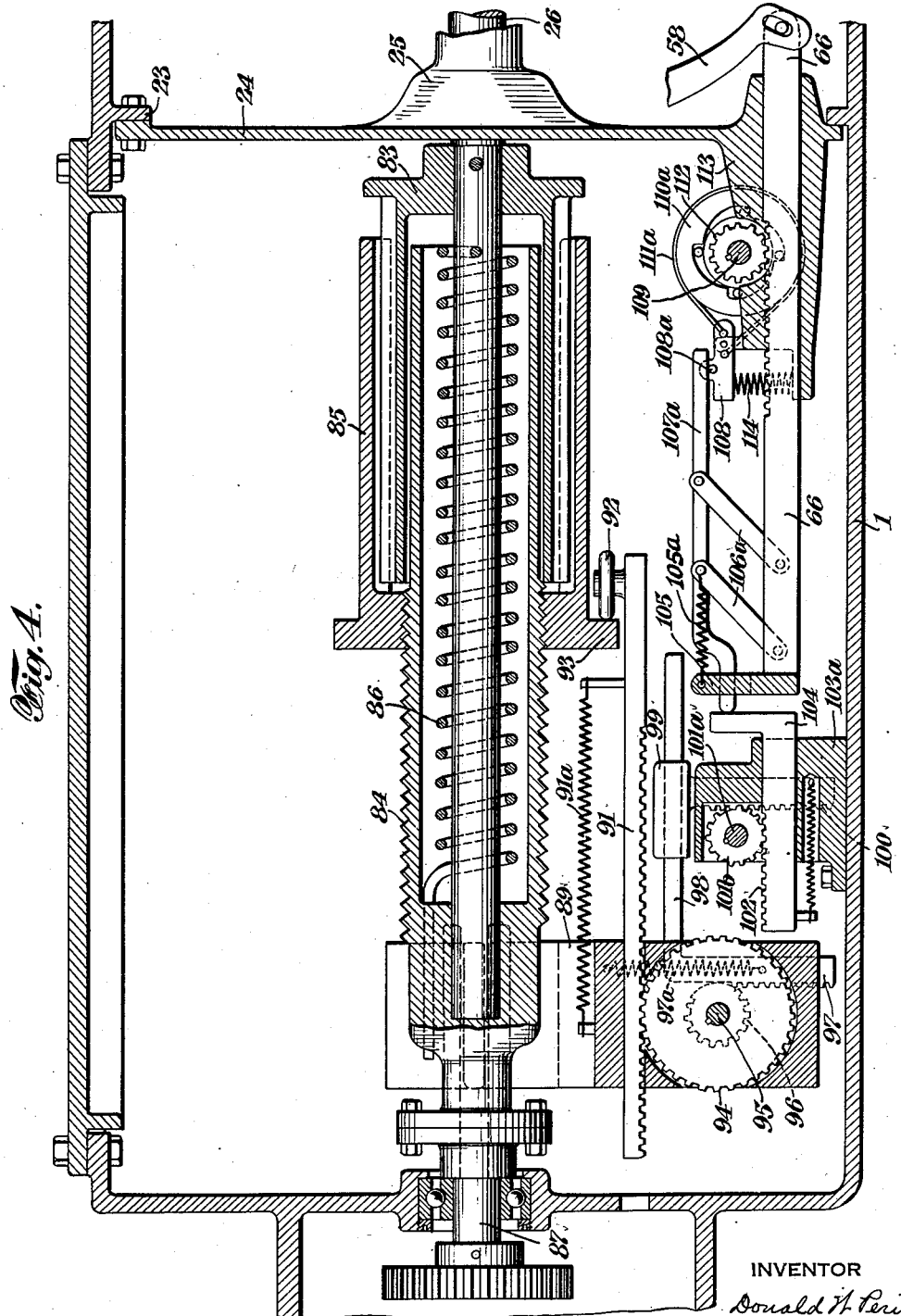

April 30, 1940. D. W. PERIN 2,199,081
VARIABLE SPEED TRANSMISSION
Filed Sept. 30, 1936 6 Sheets-Sheet 5
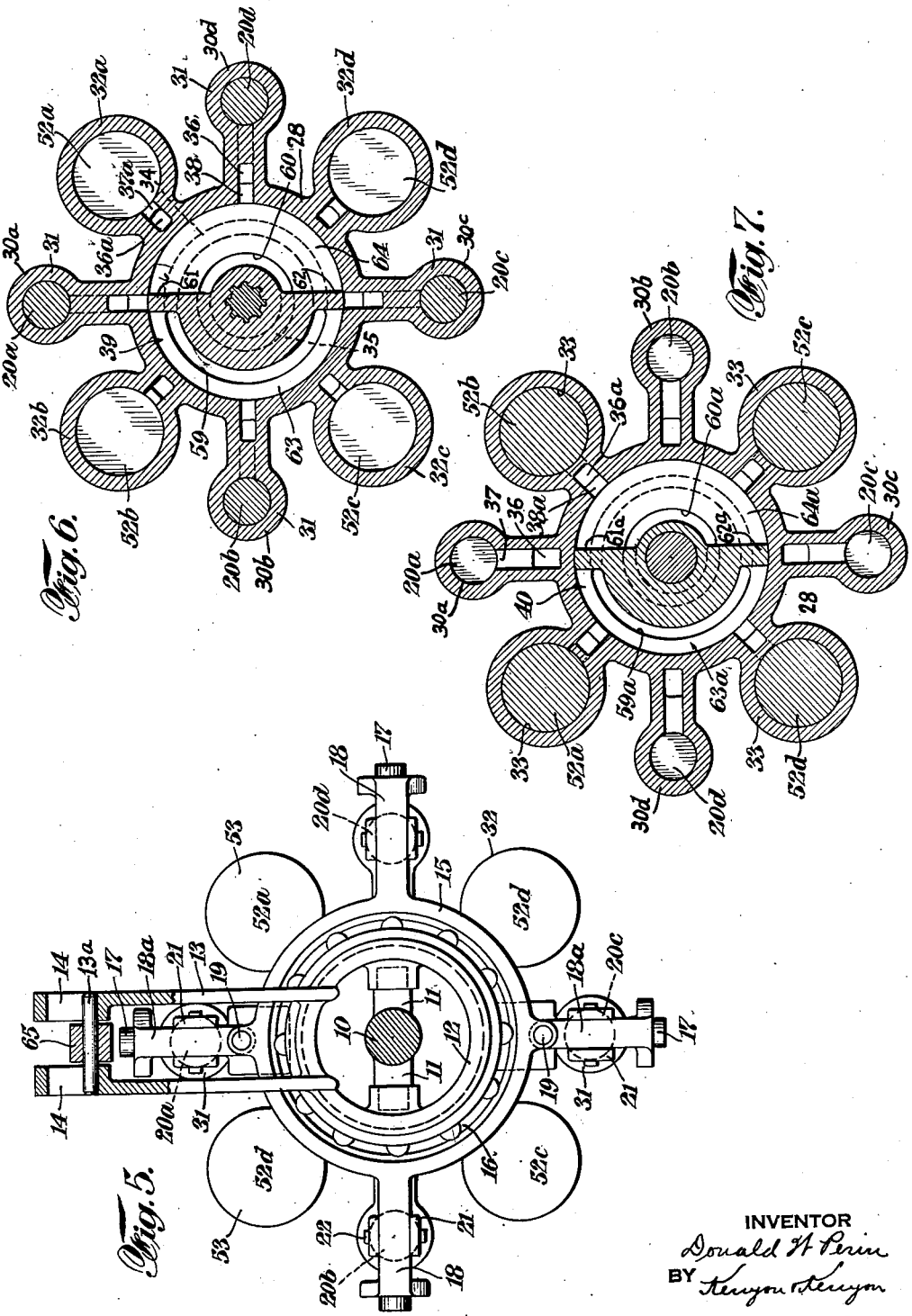
INVENTOR
Donald W. Perin
BY Kenyon & Kenyon
ATTORNEYS.

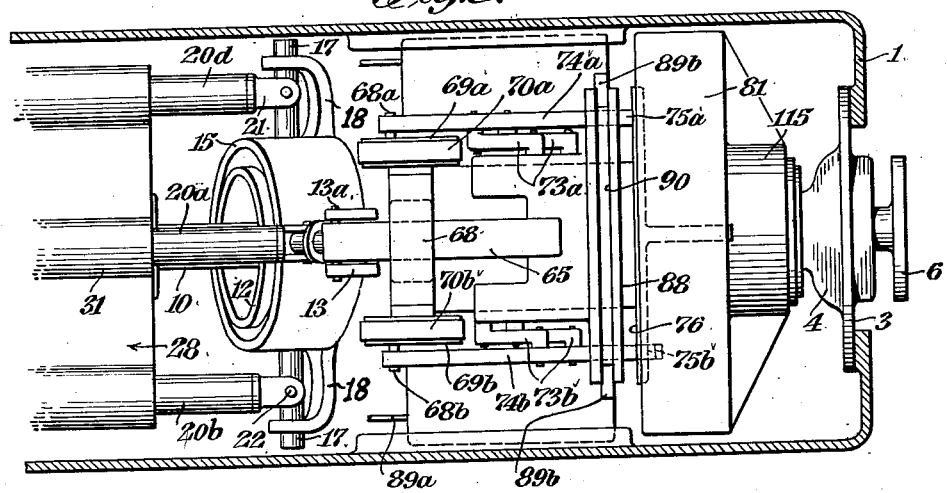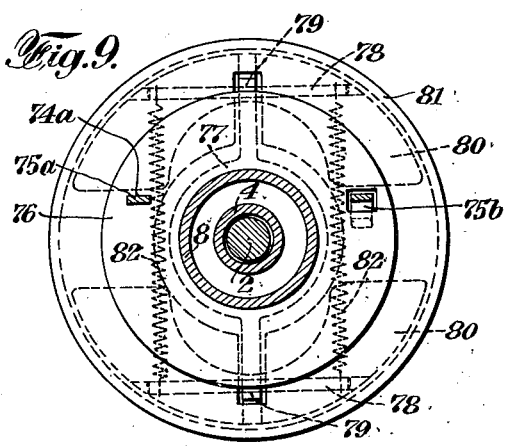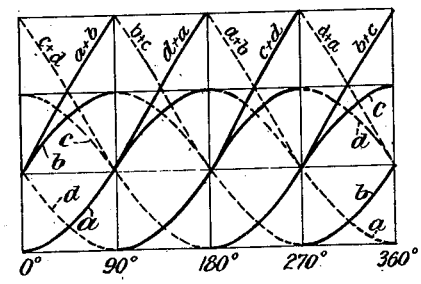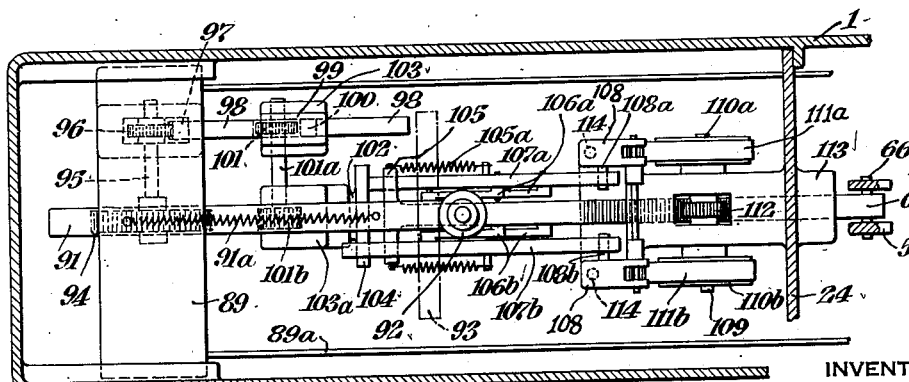

Patented Apr. 30, 1940

2,199,081

UNITED STATES PATENT OFFICE 2,199,081

VARIABLE SPEED TRANSMISSION

Donald W. Perin, New York, N. Y., assignor to
Robert W. Higgins, Greenfield, Mass.

Application September 30, 1936, Serial No. 103,290

18 Claims. (Cl. 60—53)

This invention relates to variable speed power transmission devices and more especially to such devices particularly adapted for use in internal combustion engine automobiles for transmitting power from the engine to the wheels.

An object of this invention is to provide a power transmission device having an infinite number of speed ratios between the driving and driven shafts.

Another object of this invention is to provide a power transmission device for automobiles wherein the speed ratio between the drive and driven shafts is automatically controlled to cause the automobile engine at all times to operate at its most efficient speed irrespective of the speed and/or torque requirements of the driven shaft to effect a given speed of the automobile.

The horsepower required to drive a given automobile is used in varying proportions for three different purposes. First, it is used to accelerate an automobile against its inertia from standing to a definite speed or from a definite speed to a higher speed. Second, it is used to maintain a definite speed against road resistance (including air resistance). Third, it is used to lift the weight of the automobile up various grades at various speeds. For best performance and greatest speed in traffic, the transmission system of the automobile should make it possible for the operator to have any definite horsepower up to the maximum horsepower of the engine available instantly for any or all of these uses and at the same time have the engine operate at whatever speed is most effective for the particular horsepower required. The following analysis will show how far short the conventional three-speed transmission falls of meeting the above ideal requirements.

The process of accelerating an automobile from standing to a definite speed requires the application of torque to the rear wheels. The greater the applied torque, the quicker will be the acceleration. If maximum acceleration is desired, maximum available torque must be applied as nearly continuously as possible. The torque applied to the rear wheels is equal (disregarding friction loss) to the torque of the engine multiplied by the total gear reduction ratio. However, the speed of the rear wheels will be the speed of the engine divided by the total gear reduction ratio. Maximum torque in an engine occurs at approximately one-half the speed at which the engine produces maximum horsepower. From half speed to full speed, the engine torque drops off gradually until at full speed the torque is down to approximately 85% of the maximum produced at half speed. To attain a given rear wheel speed, the transmission ratio must be twice as great at full engine speed (maximum horsepower) as it is at one-half the maximum engine speed (maximum torque). 85% of the maximum torque multiplied by twice as great a transmission ratio, produces a rear wheel torque which is 170% of the torque produced by running the engine at the speed which develops its maximum torque. Thus, maximum rear wheel torque can only be produced by maximum horsepower and at any given moment maximum engine horsepower can only be produced by the use of a transmission ratio which when multiplied by the speed of the rear wheels at the given moment will equal the engine speed at maximum horsepower.

The average torque at the rear wheels multiplied by the distance through which the car moves in a given unit of time is proportional to the average horsepower supplied through that time by the engine. Therefore, in order to supply the maximum average torque for maximum acceleration, the engine must run at maximum horsepower during the whole period of acceleration. With any fixed gear ratio, this is impossible because the rear wheel speed is constantly increasing and a constantly decreasing transmission ratio is required to maintain a constant maximum engine speed at maximum horsepower. The maximum engine speed divided by the total gear reduction will be the maximum speed the rear wheels can attain with any fixed gear ratio. Any higher wheel speed can only be obtained by shifting into another gear with a smaller reduction ratio. At any wheel speed less than the maximum possible with a given gear ratio, the engine speed must be reduced by a corresponding amount, since the rear wheel speed is always proportional to the engine speed divided by the gear ratio. The horsepower available for acceleration is thus also reduced and the maximum horsepower can be reached only at the moment it is necessary to shift into the next gear.

With the conventional multiple speed gear transmission the engine, when it is idling, does not have enough torque to start the automobile in motion from a dead stop even when multiplied by the low speed gear reduction. The driver must first speed up his engine until it has reached a speed where the horsepower developed is sufficient to maintain a torque which when multiplied by the gear ratio will be equal to the torque required to rotate the rear wheels. Actually the

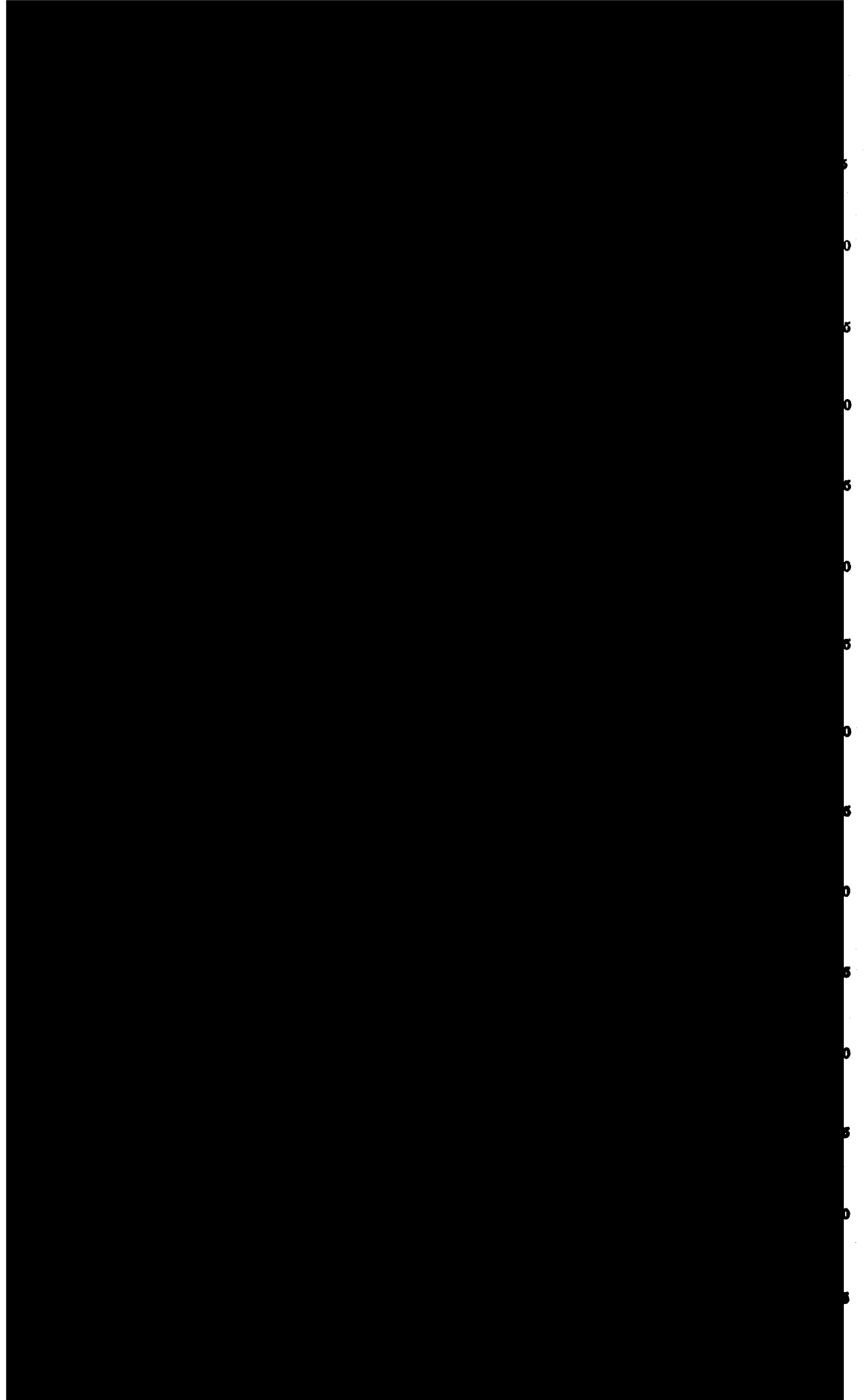

bers 31 and have their ends attached to the bars 17, the ends of the cylinders being closed by the plugs 50. Each piston rod is provided with a forked bracket 21 which is pivotally connected to a bar 17 through a pin 22. It will be seen that this arrangement causes the end point in the axis of each piston to lie continuously in the median plane of the driving wobble plate. This condition is a prerequisite to giving each piston rod horizontal reciprocating motion according to a true cosine curve as the inner ring 12 is rotated relative to the outer ring 15.

The outer casing is provided with an inward projecting flange 23 to which is fastened the flange 24 of a tubular support 25 within which is rotatably supported the driven shaft 26 through bearings 27. The block 28 is supported by the driven shaft 26 to which it is fixed by the pin 29. The cylinders 30a, 30b, 30c and 30d are spaced 90° apart in the head 28 and four other and larger diameter cylinders 32 designated 32a, 32b, 32c and 32d provided in the block 28, but are faced in the opposite direction. The last-named cylinders are spaced 90° apart from each other, but 45° from the first named cylinders and the two sets of cylinders are oppositely directed. Pistons 52a, 52b, 52c and 52d are arranged in the cylinders 32 and pass through guides 33. Each of the cylinders is closed by a cap 53.

Within the block 28 are provided two fluid chambers 34 and 35, the chamber 34 being designated as high pressure chamber and the chamber 35 being designated as the low pressure chamber. Passages 36 connect ports 37 of cylinders 30a, 30b, 30c and 30d with valve ports 38 spaced 90° apart and the head 28 is provided with annular grooves at its forward or right end of the head into which fit annular rings 39a on the inside face of a rotary valve 39 keyed to the extension 10 and fitting in a recess in the head. Similar annular grooves are provided at the rear end of the head 28 into which fit annular rings 40a on the inside face of a valve 40 which is attached to the support 25, and fits in a recess in the head. Passages 36a connect cylinder ports 37a of cylinders 32a, 32b, 32c and 32d with the valve ports 38a spaced 90° apart and each oriented 45° with respect to ports 38. The valves 39 and 40 control flow through the ports in a manner subsequently to be described. The valve 39 is provided with an annular ring 39b at its outer surface which runs in an annular groove on the inner surface of a cap 41 bolted to the head with an interposed gasket 42. The cap 41 contains a stuffing box 43 to prevent any fluid escaping around the drive shaft extension 10 and also carries a bearing 44 to maintain alinement of the driving and driven shafts. A cap 45 is bolted to the rear end of the head 28 with an interposed gasket 46 and contains a stuffing box 47 to maintain a fluid-tight joint between the cap and the outer surface of the hub of the valve 40. Inside the hub of the valve 40 is a stuffing box 48 to prevent any fluid escaping around the driven shaft 26.

The pistons 52a, 52b, 52c and 52d are connected with the outer ring 54 of the driven end wobble plate W₂ through forked brackets 51, sliding and rotating bars 51a, rigid and pivoted C-shaped brackets 51b and 51d, respectively and pins 51c in the same manner as previously described in connection with the driving end plate W₁. The outer ring 54 is rotatably mounted on an inner ring 55 through roller bearings 56, the inner ring being tiltably mounted on the support 25 by means of trunnions 57. An arm 58 extends from the inner ring 55 and has a slot 58a similar to the slot 14. A rack arm 66 is connected to the arm 58 by means of a pin 66a extending through the slot 58a and constitutes means for tilting the wobble plate W₂ as will subsequently be described.

Referring now to Fig. 12, the valve 39 has on one face a semi-circular port 59 which is at all times in communication with the high pressure chamber 34 and a semi-circular port 60 which is at all times in communication with the low pressure chamber 35. In the peripheral surface of the valve 39 is formed a channel 63 which communicates with the port 59 and a channel 64 which communicates with the port 60. The channels 63 and 64 are separated by two solid or dead center portions 61 and 62, the width of which is slightly greater than the width of the ports 38 over which these channels pass upon relative rotation of the valve 39 and the block 28.

The high and low pressure chambers, the spaces between the pistons and cylinder caps, the passages from the cylinder ports to the valve ports and the passages within the valves are all completely filled with a non-compressible fluid- forming continuous system of mechanical leverage in which no part can move without causing movement of some other part.

With the wobble plate W₁ in the position shown in Figs. 1 and 3, relative rotation of the two rings 12 and 15 will impart reciprocating motion to the four pistons 20a, 20b, 20c and 20d. The amplitude of stroke of this reciprocating motion will be proportional to the tangent of the angle to which the wobble plate is tilted on its trunnions. The horizontal distance through which each piston travels is proportional to the cosine of the angle through which the drive shaft is rotated relative to that piston. The rate of travel of each piston is proportional at any moment to the slope of the curve drawn to represent the cosine of the angle through which the drive shaft is rotated relative to that piston.

With the wobble plate tilted, there is a universal joint action between the axis of the wobble plate and the axis of the shaft. This action will cause the points in the axes of the bars 17 where the axes of the piston rods intersect them to lie along radii from the center of the median plane of the wobble plate which vary from being exactly 90° apart as the inner ring 12 is rotated relative to the outer ring 15. This variation is taken up and made possible by the pivotal support for two of the brackets 18.

When the driving shaft is rotated relative to the cylinder blocks 28, the inner ring 12 and the valve 39 must turn with it. The piston rods 20 prevent the outer ring 15 from turning relative to the cylinder block and the rotation of the inner ring 12 relatively to the outer ring 15 is the same as the rotation of the valve 39 relative to the cylinder block 28.

Operation of the above-described arrangement may be understood by reference to Fig. 3. As the drive shaft begins to rotate relative to the block 28, piston 20a begins to move toward the rear, forcing the fluid in the cylinder 30a through corresponding port 37 and passage 36. At the same moment, valve 39 rotates to bring the top portion of the channel 63 under the corresponding valve port 38, allowing fluid to be forced through the channel 63 and port 59 into the high pressure chamber 34. Cylinder 30b already has its corresponding port in communication with the channel 63 and the piston 20b is at the cen-

This relationship requires, that if the driven cylinders are larger in diameter than the driving cylinders, either the Sa must be increased proportionally over the Sb or Nr must be increased proportionately over Nb.

The transmission may be designed with any desired ratio between the areas of the two sets of cylinders, to give whatever maximum transmission ratio is required at maximum horsepower, as will be explained later. In the present case, $Ab=3Aa$. This modifies the statement of relationship given above to read as follows: $Sa \cdot Nr = 3Sb \cdot Nb$. But $Na = Nr + Nb$ and by substituting this value for Nr in the above equation and transposing the following value for the transmission ratio is obtained.

$$\frac{Na}{Nb} = \frac{3Sb + Sa}{Sa}$$

Sa is directly proportional to the distance through which rack arm 65 has moved in tilting arm 13 of inner ring 12 away from the position where the median plane of the wobble plate is perpendicular to the axis of the drive shaft. Sb is directly proportional to the distance through which rack arm 66 has moved in tilting arm 58 of inner ring 55 away from the position where the median plane of the wobble plate is perpendicular to the axis of the driven shaft. For the purposes of the formula for the transmission ratio these distances may be substituted for Sa and Sb.

There is a natural reaction of forces present in the wobble plates which tend to tilt them four times during each revolution of the outer rings, first toward and then away from the positions where their median planes are perpendicular to the axis of the drive shaft. This tilting is prevented in the driving-end wobble plate W1 by rack arm 65, the rack teeth on the under side of which mesh with pinion 116. Pinion 116 is keyed to shaft 67 which is mounted in bearings in post 68 which is part of rotating carrying member 8.

On one end of the shaft 67 is keyed a one-way roller clutch or ratchet 69a and on the other end is keyed a one-way roller clutch or ratchet 69b, the arrangement of the ratchet 69a being reverse to the ratchet 69b. The outer rims of these ratchets are formed as brake drums and are surrounded by brake bands 70a and 70b which are operated by pivoted levers 68a and 68b. A spring 71 holds each brake band in locking position. When the brake band 70a is locked and 70b released, roller ratchet 69a permits shaft 67 and pinion 116 to rotate so that the rack arm 65 may move to permit the wobble plate W1 to tilt away from the neutral position where it is perpendicular to the axis of the shaft, but not in the opposite direction. When the brake band 70b is locked and 70a released, the roller ratchet 69b permits shaft 67 and pinion 116 to turn so that rack arm 65 may move to permit the wobble plate to tilt toward its neutral position where it is perpendicular to the axis of the shaft, but not in the opposite direction. When both brake bands 70a and 70b are locked, the rack arms 65 cannot move in either direction. When the brake band 70a is released, the wobble plate will move by its own internal force reactions toward its vertical neutral position and when the brake band 70b is released, the wobble plate W1 will move by its own internal force reaction away from its vertical neutral position. This applies to all positions of the wobble plate except its neutral position. If the wobble plate is already in neutral position the same force which releases brake band 70b, namely, the pull of sleeve 77 on hook 75b transmitted by rods 74b and 73b to sleeve 72, will tilt the wobble plate away from its neutral position.

A sleeve 72 of which the rack arm 65 is an extension is arranged to slide forward and back along the member 8. The sleeve 72 carries a set of pivoted parallel arms 73a and another set of pivoted parallel arms 73b. The arms 73a are pivoted to a bar 74a in such manner that when the end 75a of the bar 74a is pushed in flush with the face 88 to sleeve 72, the extension of the bar 74a will actuate the arm 68a and release the brake band 70a. The arms 73b are pivoted to a bar 74b in such a manner that when the end 75b of the bar 74b is pulled away from the face 88 of the sleeve 72, the extension of the bar 74b will actuate the arm 68b and release brake band 70b. The bar 74b extends through a flange 76 of the cam sleeve 77 and is provided with means engaging the flange to pull it away from the face 88 of the sleeve 72 whenever the cam sleeve 77 moves away from the sleeve 72. It will thus be seen that the action of the two bars in releasing the proper brake at the proper moment will cause the sleeve 72 to follow the forward and back motion of the cam sleeve 77 exactly without the necessity of cam sleeve 77 exerting any force other than that necessary to depress the brake springs, except that at moments when the internal forces are neutralized, as when the wobble plate is in neutral position, sleeve 77 can exert a direct force on sleeve 72 through either hook 75b or rod end 75a.

Cam sleeve 77 is moved forward and back along the member 8 by the action of pins 78 in cam slots 79. The pins 78 are fastened in slotted weights 80 which are moved outward in guides 81 by centrifugal force and inward by springs 82. Guides 81 are part of the sleeve 115 which is pressed on or otherwise fastened to the member 8. The weights 80 and springs 82 are so proportioned that the weights will be all the way out when the drive shaft rotates at the maximum speed of the engine, and all the way in when the drive shaft rotates at the idling speed of the engine. The shape of the cam slots 79 is to be designed after dynamometer tests of the particular engine to be used in the car with this transmission. The shape will be such that the cam sleeve 77 will be moved forward a distance proportional to the desired torque of the engine at each different engine speed.

The engine tests should be run at several different throttle openings, recording curves of horsepower, torque and fuel economy against speed. From these curves a curve of desired engine torque should be plotted against engine speed. At the smaller throttle openings the torque should be selected which is produced by the engine at the speed of best fuel economy for each throttle opening. As the throttle openings increase the torque should be selected more and more toward the speed of maximum horsepower for each throttle opening, until when wide open throttle is reached the last point on the curve of desired torque plotted against speed, will be the torque produced at maximum horsepower.

At the rear of flange 24 of the bearing support 25, a hollow cylinder 83 concentric with the driven shaft 26, is pinned to the driven shaft 26. The inner surface of cylinder 83 is smooth and can rotate relative to the smooth outer forward surface ratio of the torque in the driven shaft to the torque in the driving shaft.

Thus it is demonstrated that the speed and torque control mechanisms illustrated here, will automatically change and control the transmission ratio in such manner that for each throttle opening the engine will run at a speed, torque and horsepower that have been predetermined to be most desirable for that particular throttle opening.

The operation of the car will be as follows: The engine is started and warmed up with the gear box disconnecting the transmission from the drive shaft to the rear axle. When the engine warms up enough to run smoothly at idling speed, the gear box is set for forward speed and need not be used again unless it is desired to reverse the car. When the car is stopped, with the engine idling, both wobble plates have their median planes perpendicular to the axis of the shafts. In this position the inner ring 12 of the driving wobble plate is free to rotate without causing any reciprocation of the pistons and therefore there is no motion of the car.

As soon as the throttle is open enough to increase the engine speed above idling, the action of the weights 80 causes the sleeve 77 to move to the right, thus pulling the bar 74b to release the brake band 70b thereby permitting movement of the rack bar 65 to the right, to effect tilting of the wobble plate $W_1$. Should it happen that the wobble plate does not tilt of its own accord, continued outward movement of the weights upon increased engine speed will eventually move the bar 74b to the limit of its stroke and further movement will effect positive movement of the sleeve 72 with consequent positive movement of the arm 13. This movement can occur freely whenever points 61 and 62 come in line with cylinders 32a and 32c or 32d and 32b, as viewed in Fig. 6. At the first such point for example, the pivot points of the wobble plate $W_1$ will be in line with cylinders 32b and 32d. The cylinders 30a and 30b will both be in communication with the high pressure chamber and will lie equidistant from the pivot points. Therefore, any tilting of $W_1$ away from its neutral position will force fluid out of 30b into the high pressure chamber at the same time withdrawing an equal amount of fluid from the high pressure chamber into 30a. Likewise, in this same position, tilting of $W_1$ will force fluid out of 30c into the low pressure chamber and an equal amount of fluid out of the low pressure chamber into 30d. This puts a drag or torque on the outer ring 15 of the wobble plate $W_2$, and through it and the pistons 20a, 20b, 20c and 20d puts the same torque, equal to the small torque of the engine at that speed, on the driven shaft 26. The rear wheels, and, therefore, the cylinder 84 will remain stationary until sufficient torque is built up in the rear axle to start the car. The small torque on the driven shaft will rotate cylinder 83 against the spring torsion, relative to stationary cylinder 84, thus putting the torque control mechanism in operation to tilt the driven wobble plate $W_2$. $W_2$ can be freely tilted from its neutral position by the torque control mechanism, whenever points 61a and 62a of the valve line up with cylinders 30a and 30c as shown in Fig. 7, or with 30b and 30d. This action occurs in a similar manner to that previously explained for $W_1$. Whenever both wobble plates are tilted away from their neutral positions at the same time, reaction forces from the pistons, reversing direction four times during each revolution, will tend to tilt the plates $W_1$ and $W_2$, in whichever direction the brakes controlling the tilts will permit at the moment. These forces are present because any two cylinders connected with a given chamber at a given moment are constantly varying their distances from the tilting centers of the wobble plate driving them. During any tilting motion of either wobble plate, the rate of flow of fluid from the high pressure chamber to the low pressure chamber will be accelerated or retarded according to the direction of tilting, and the ratio between engine speed and driven shaft speed will be momentarily varied in the same manner. Any such variations, however, can only last during one quarter revolution, and any resulting variations in rear wheel torque would be smoothed out by the torque spring 86 so as to be unnoticeable to the occupants of the car. As soon as the driven wobble plate $W_2$ tilts, it permits the pistons 52a, 52b, 52c and 52d to operate and its torque reaction against its stationary inner ring 55 is added to the torque in the driven plate provided originally by the drag from the driving wobble plate. This added torque causes the torque control to tilt the driven wobble plate still more, and this action is cumulative until the rear wobble plate reaches its maximum tilt.

At this point, if the engine speed is only slightly higher than idling speed and the driving wobble plate tilted only slightly, the transmission ratio would be practically infinite and even the small torque of the engine at this speed when multiplied by such a great ratio would start the car moving very slowly, but with almost irresistible force. As the throttle is opened further, the engine speed increases, tilting the front wobble plate more and providing more engine torque. This new engine torque when multiplied by the new slightly reduced transmission ratio, would soon provide sufficient torque at the rear wheels to accelerate the car rapidly. As the car speed increases, the speed and torque controls cooperate to tilt the rear wobble plate $W_2$ back toward the position where its median plane is perpendicular to the axis of the driven shaft, in such a manner that a transmission ratio will be provided at each moment that will keep the engine running at the same predetermined speed and torque as is called for by the throttle opening being used at the moment. When the rear wobble plate $W_2$ is finally tilted back to its original neutral perpendicular position, no stroke of the driven pistons is possible, Sb becomes zero and the formula for the transmission ratio becomes equal to 1, or in other words, the car is in direct drive, and none of the pistons are working at all. If while operating in direct drive the throttle is opened still further to increase the car speed, the rear wobble plate $W_2$ will tilt forward just enough to produce a transmission ratio which when multiplied by the old engine speed, will be equivalent to the new engine speed, corresponding to the new throttle opening.

This tilting of the rear wobble plate $W_2$ will produce an increased torque which will increase the car speed. As the car speed increases the rear wobble plate $W_2$ will again return toward its neutral position until it is again in its neutral perpendicular position, putting the car again in direct drive at the new engine speed corresponding to the new throttle opening.

As the throttle opening increases, it will be seen from the formulae, explained in the foregoing paragraphs, that the maximum transmistively releasing the brake devices for the rack shaft connected to the operating arm of the first wobble plate, and means responsive to the torque delivered by the driven shaft for selectively releasing the brake devices for the rack arm connected with the operating arm of the second wobble plate.

11. A variable speed transmission according to claim 5 in which each variable plate has an operating arm, a rack bar connected to each arm, two brake devices for each rack bar of which one prevents movement of the rack bar in one direction and the other prevents movement of the rack bar in the other direction, means responsive to the speed of the driving shaft for selectively releasing the brake devices for the rack bar connected to the operating arm of the first wobble plate, and means responsive to the resistance to the torque delivered by the driven shaft for selectively releasing the brake devices for the rack arm connected with the operating arm of the second wobble plate.

12. A variable speed device according to claim 5 characterized by a driven shaft consisting of two relatively rotatable sections, resilient means interconnecting said sections, means responsive to the speed of the driving shaft for tilting the first wobble plate, and means actuated by relative rotation of said two driven shaft sections to tilt said second wobble plate.

13. A variable speed device according to claim 1 characterized by a driven shaft consisting of two relatively rotatable sections, resilient means interconnecting said sections, means responsive to the speed of the driving shaft for tilting the first wobble plate, and means actuated by relative rotation of said two driven shaft sections to tilt said second wobble plate.

14. A variable speed device according to claim 5 characterized by a driven shaft consisting of two relatively rotatable sections, resilient means interconnecting said sections, means responsive to the speed of the driving shaft for tilting the first wobble plate, and means actuated by relative rotation of said two driven shaft sections and controlled by the first wobble plate actuating means to tilt said second wobble plate.

15. A variable speed device according to claim 1 characterized by a driven shaft consisting of two relatively rotatable sections, resilient means interconnecting said sections, means responsive to the speed of the driving shaft for tilting the first wobble plate, and means actuated by relative rotation of said two driven shaft sections and controlled by the first wobble plate actuating means to tilt said second wobble plate.

16. A variable speed transmission comprising a driving shaft, a driven shaft, and a stationary housing, two sets of reciprocating elements carried by one of said shafts, means carried by the other shaft for effecting reciprocation of one of said sets of elements, means carried by the stationary housing for effecting reciprocation of the other set of elements, both of said means being adjustable to change the lengths of strokes of their respective reciprocating elements.

17. A variable speed transmission according to claim 16 wherein both of the means for effecting reciprocation are adjusted automatically.

18. A variable speed transmission according to claim 16 wherein one of the means for effecting reciprocation is adjusted according to the speed of the driving shaft and the other means is adjusted according to the torque on the driven shaft.

DONALD W. PERIN.